(No Model.) 2 Sheets—Sheet 1.
F. JOHNSON.
ELECTRIC LIGHTING SYSTEM.
No. 425,801. Patented Apr. 15, 1890.
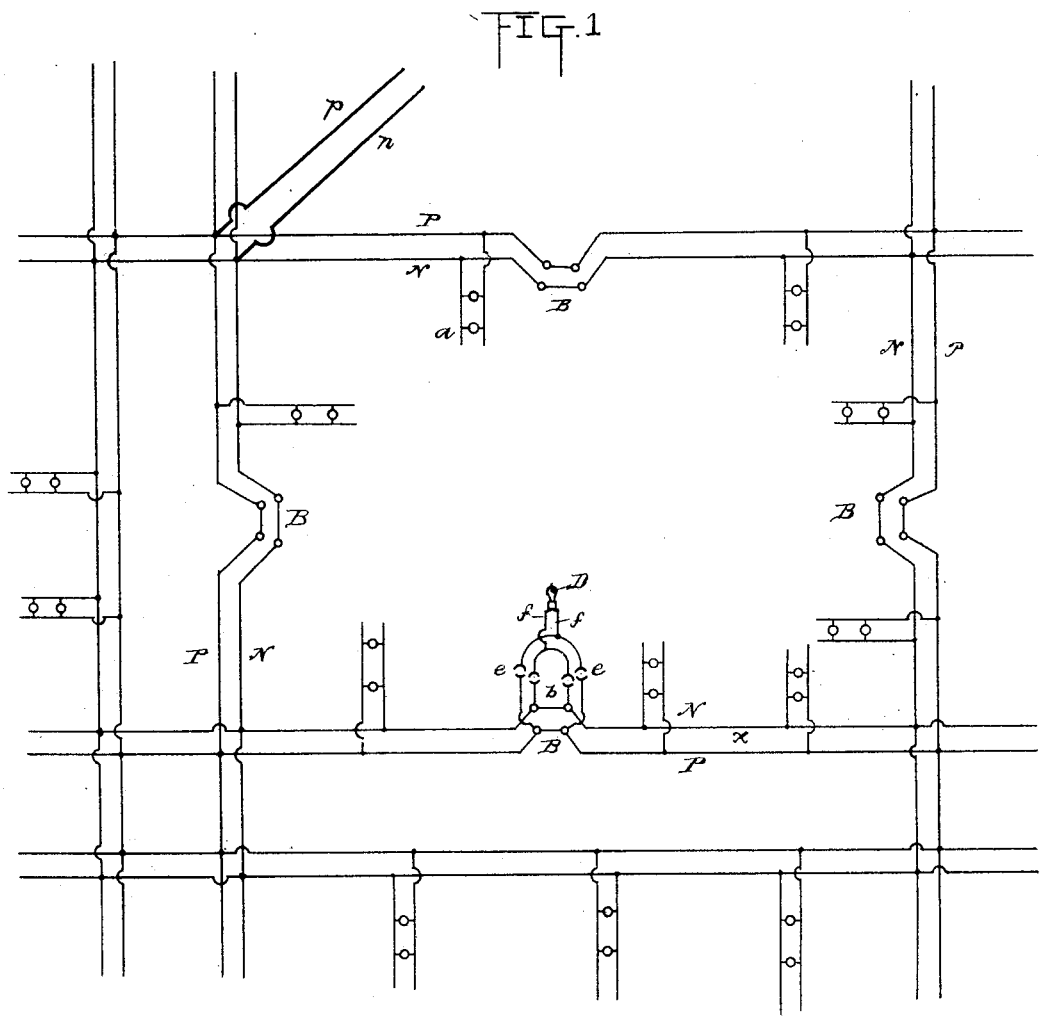

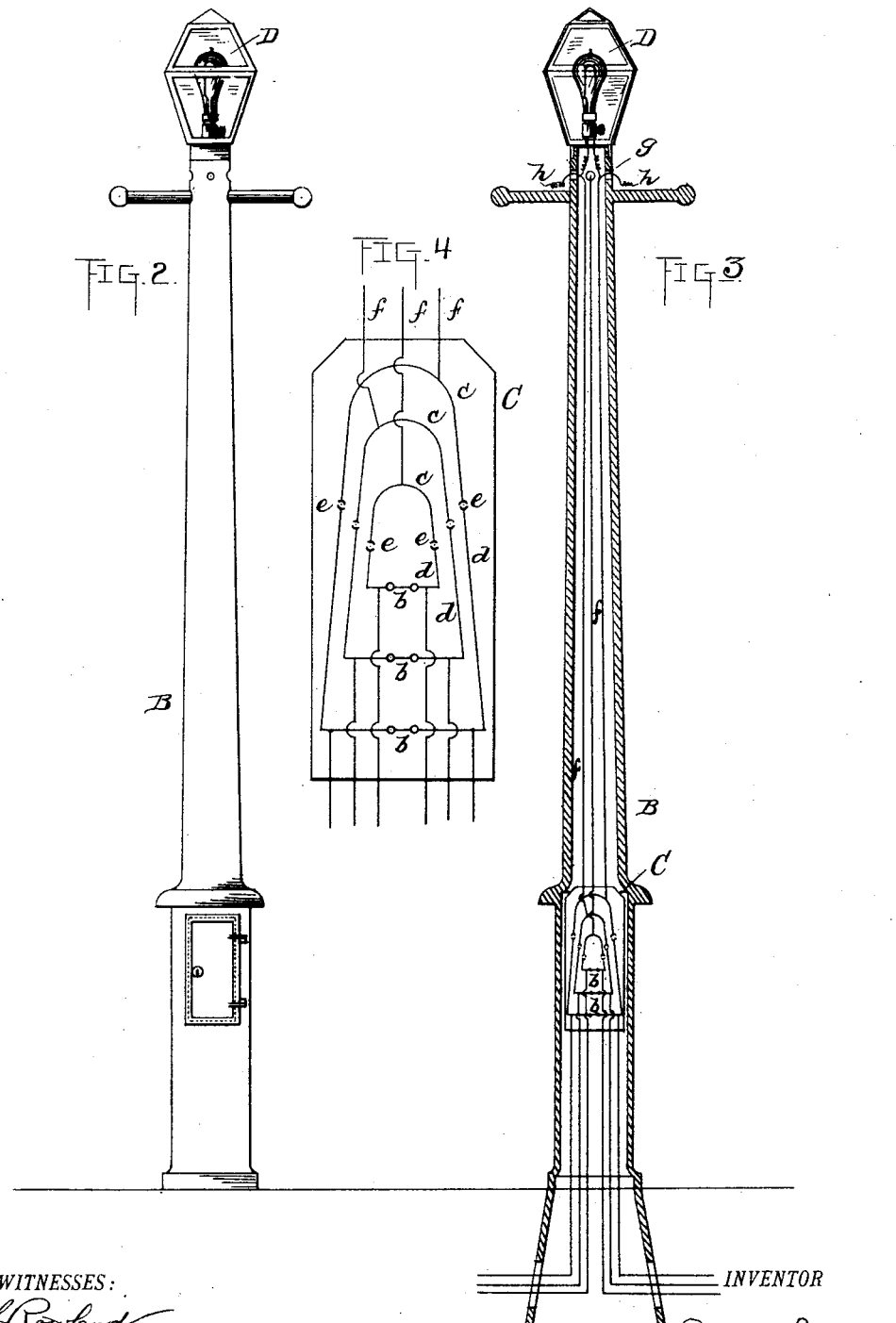

UNITED STATES PATENT OFFICE.

FREDERICK JOHNSON, OF BROOKLYN, ASSIGNOR TO THE EDISON MACHINE WORKS, OF SCHENECTADY, NEW YORK.

ELECTRIC-LIGHTING SYSTEM.

SPECIFICATION forming part of Letters Patent No. 425,801, dated April 15, 1890.

Application filed November 2, 1889. Serial No. 329,067. (No model.)

*To all whom it may concern:*

Be it known that I, FREDERICK JOHNSON, a citizen of the United States, residing at Brooklyn, in the county of Kings and State of New York, have invented a certain new and useful Improvement in Electric-Lighting Systems, of which the following is a specification.

My invention relates, mainly, to multiple-arc systems of electric lighting, such as the Edison system, in which the conductors are placed underground and laid in pairs around the blocks of the district supplied, with the intersecting conductors connected together at the street corners, positive to positive and negative to negative, so as to form a connected net-work of conductors throughout the district, such conductors being supplied with current by feeding-circuits connected therewith at various points.

One object of my invention is to enable the location of leaks or crosses on the underground line to be readily determined. A further object is to enable those portions of the district which are temporarily disabled by the presence of such leaks or crosses to be supplied with current while the fault is being remedied.

In carrying my invention into effect I place at a suitable point on the face of each block, preferably at the middle of the block in each conducter of the line, a fusible link or safety-catch. In order to have such safety-catches in a conveniently accessible position I prefer to place them within a suitable post—such as a street-lamp post— and to provide a door or opening in the post through which the safety-catches may be reached. Furthermore I form from each conductor a loop or shunt circuit around its safety-catch and I extend from each loop a wire running to the top of the post and brought out through apertures at the top, so that temporary overhead wires can be connected at this point with the system for the purpose of supplying houses which are temporarily cut out by a leak. I prefer to provide each side of each of the shunt-circuits with a switch, such as a suitable plug, to be used for testing purposes, and also for closing the temporary circuit, as will be hereinafter explained.

My invention is illustrated in the accompanying drawings.

Figure 1 is a diagram showing the conductors on a block provided with my invention; Fig. 2, a view in elevation of the post containing the testing devices; Fig. 3, a vertical section of the same, and Fig. 4 a diagram of the testing switch-board within said post.

Fig. 1 shows the invention in connection with a two-wire system, and the remaining figures represent a three-wire system, my invention being equally applicable to both systems.

Referring first to Fig. 1, P and N are positive and negative main conductors of the system, extending around the block A and supplied by a feeding-circuit $p\ n$ and supplying current to lamps or other translating devices $a$. On the face of each block, at B, is placed a lamp-post, into which the underground wires are run, as represented in Fig. 3, such wires being brought up to a switch-board C, and the wires coming from each end of the block being connected on the switch-board through fusible safety-catches $b$. It will be understood that this portion of the description applies equally to the two-wire and the three-wire systems. Around each safety-catch $b$ is formed a loop $c$, and in each side of each loop is placed a plug-switch $e$, such switches being normally open. From the upper part of each loop a wire $f$ is run to the top of the pole, where apertures $g$ are provided, out of which wires $h$ run, connected with the wires $f$ inside the post. The incandescent electric lamp D at the top of the post is connected in a multiple-arc circuit between the positive and negative wires in the two-wire system, or between the neutral wire and either the positive or the negative in the three-wire system.

When a leak or short circuit occurs on the system—for instance, at the point $x$, Fig. 1— such a leak will cause the safety-catch $b$ nearest to it to be fused by the increased difference of potential. Upon the operators of the system becoming aware that the circuit has been thus broken they proceed by opening the doors of the lamp-posts to learn at what post the safety-catch has been fused. This will indicate on what block the leak has taken place. It is then desired to find on which side of the lamp-post the leak is, and to do this the person making the test closes the plug-switches first on one side of the loops and then on the other and observes whether the lamp at the top of the post is lighted or not. If the lamp does not light when the plugs are placed in one side, it indicates that the leak is on that side and that current is being supplied from the other direction. This locates the leak very closely, within not more than half a block, and the defect can thus be readily remedied. While this is being done wires may be run overhead from the temporary connections at the top of the post to supply those houses along the block which by reason of the leak are deprived of current.

What I claim is—

1. The combination, with the intersecting and connected conductors of an electric-lighting system, of fusible safety-catches interpolated in said conductors between the points of intersection and connection and an indicating device in a loop around the fuse, substantially as set forth.

2. The combination, with the underground conductors of a system of electric lighting, of a hollow pole or post into which said conductors are brought and means within said post for making connections with overhead wires, substantially as set forth.

3. The combination, with the main conductors and the safety-catches interpolated therein, of the loops around the safety-catches and the circuit-controllers in each side of each loop, substantially as set forth.

4. The combination, with the main conductors and the safety-catches interpolated therein, of the loops around the safety-catches and the indicator-lamp connected in multiple arc between such loops, substantially as set forth.

This specification signed and witnessed this 19th day of October, 1889.

FREDERICK JOHNSON.

Witnesses:
D. H. DRISCOLL,
WILLIAM PELZER.